Dec. 7, 1926.
R. OSAKA
1,609,766
HUMIDIFIER CABINET
Filed Nov. 2, 1925   2 Sheets-Sheet 2
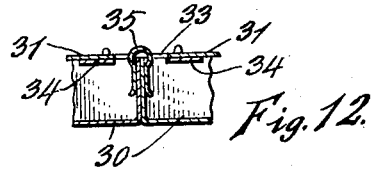
Fig. 12.
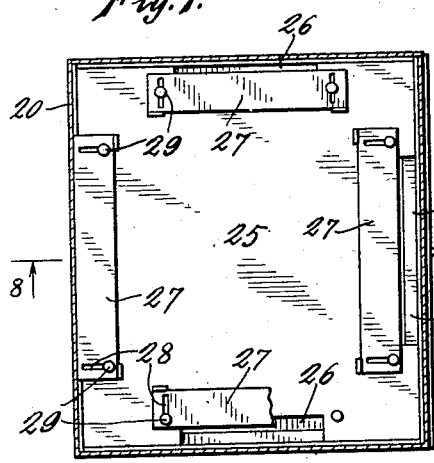
Fig. 7.
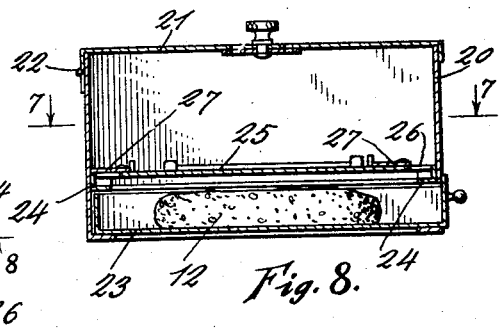
Fig. 8.
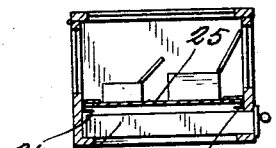
Fig. 9.
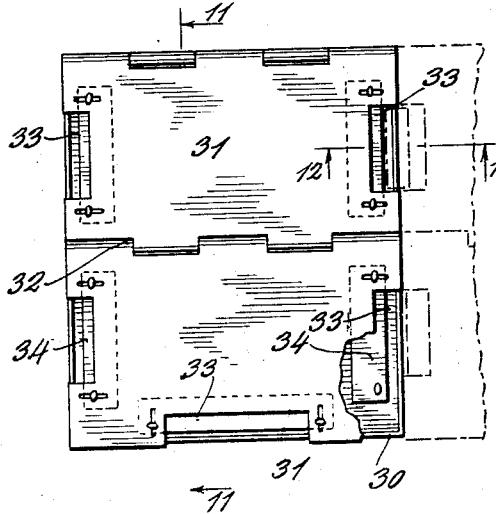
Fig. 10.
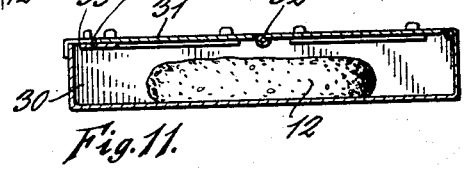
Fig. 11.
Fig. 13.
Inventor
Rikijiro Osaka.
By A. J. O'Brien
Attorney Patented Dec. 7, 1926.

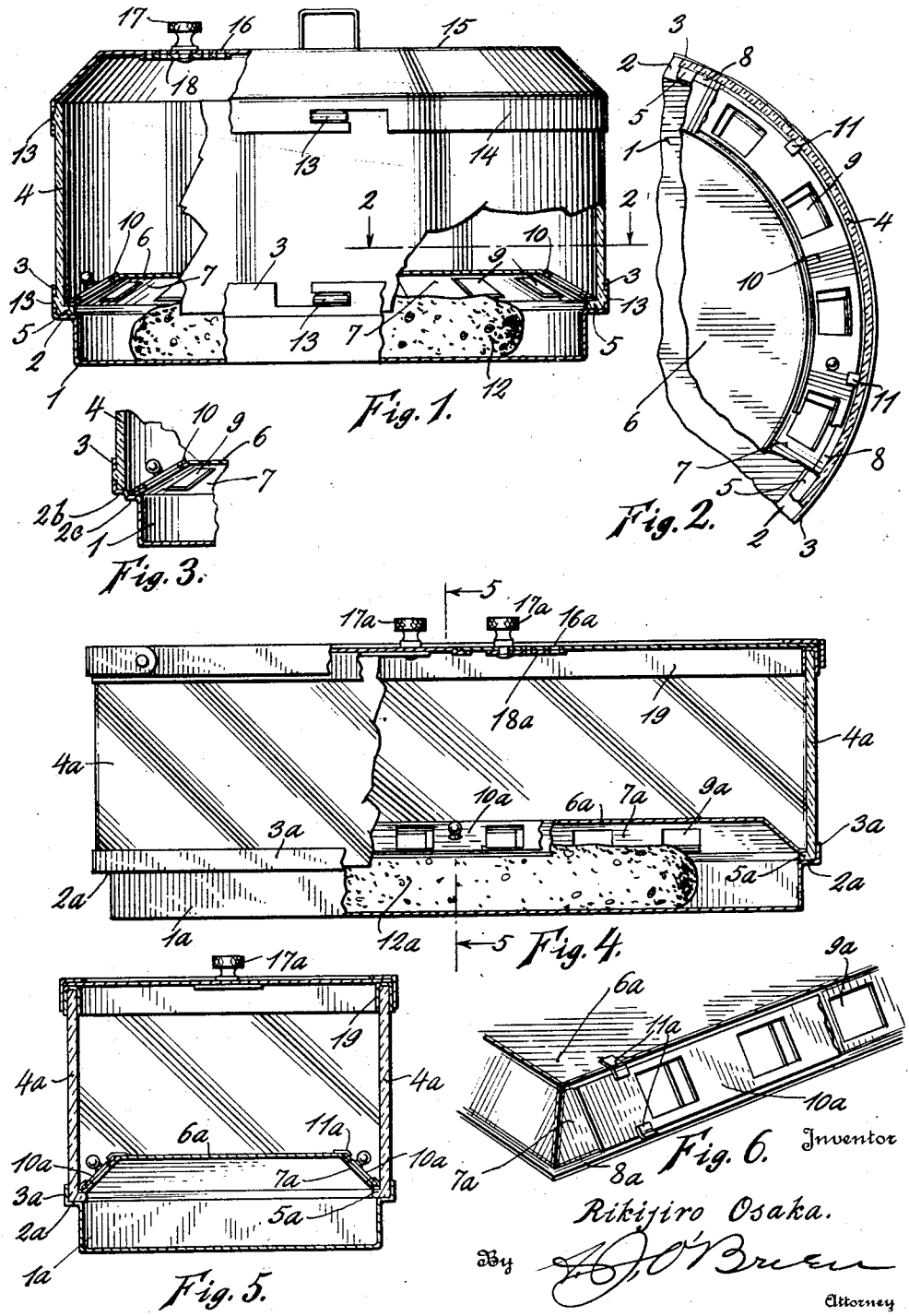

1,609,766

UNITED STATES PATENT OFFICE.

RIKIJIRO OSAKA, OF WRAY, COLORADO.

HUMIDIFIER CABINET.

Application filed November 2, 1925. Serial No. 66,200.

This invention relates to improvements in humidifier cabinets and shows an improvement in the construction shown and described in my copending application Serial No. 22,190, filed April 10, 1925.

It is well known that many things are injured in quality if they are allowed to become too dry, as, for example, bread, cake and cigars. The fact that cigars have their quality adversely affected by becoming too dry has long been recognized and various forms of humidifiers have been invented for the purpose of keeping cigar cases at the proper humidity.

It is the object of this invention to produce a device that shall be adapted to be used in connection with cigar cases and containers for foods, as bread, cake and pies are also better preserved, for a limited time, by being kept in a moist atmosphere.

My invention briefly described comprises a container having a separate compartment at its base for the reception of a moist sponge or water. This compartment is separated from the upper part of the container by a member provided with a number of openings whose area may be altered by means of an adjustable slide.

In order to describe my invention with greater particularity I shall have reference to the accompanying drawings in which the preferred embodiment thereof has been illustrated and in which:

Fig. 1 is a side elevation of a cylindrical bread and cake box constructed in accordance with my invention, portions of the sides of the box being broken away and parts shown in section to more clearly disclose the construction;

Fig. 2 is a section taken on line 2—2, Fig. 1;

Fig. 3 is a sectional detail showing a slightly modified form of construction;

Fig. 4 is a side elevation of a rectangular cake and bread box, parts being broken away so as to more clearly disclose the construction and parts being shown in section;

Fig. 5 is a section taken on line 5—5, Fig. 4;

Fig. 6 is a perspective view showing a portion of the member that covers the lower compartment;

Fig. 7 is a tranverse sectional view taken on line 7—7, Fig. 8;

Fig. 8 is a vertical section taken on line 8—8, Fig. 7;

Fig. 9 is a transverse vertical section showing a cigar case provided with the humidifier illustrated in Figs. 7 and 8;

Fig. 10 is a top plan view of a modified form of humidifier pan;

Fig. 11 is a section taken on line 11—11, Fig. 10;

Fig. 12 is a section taken on line 12—12, Fig. 10 and shows the manner of attaching two adjacent pans, and Fig. 13 is a transverse section of a cigar case provided with the humidifier pan shown in Figs. 10, 11 and 12.

In Figs. 1, 2 and 3, I have illustrated a humidifier which is suitable for use as a container for bread, cakes and pies as well as for many other things. This container consists of a pan or bottom member 1 having an outwardly extending flange 2 whose outer edge terminates in an upwardly extending cylindrical flange 3. A cylindrical ring like member 4 of glass or any other suitable material rests upon the horizontal annular flange 3 and has its lower end provided with an inwardly extending flange 5 which forms an annular seat upon which the perforated partition member 6 rests. This partition member has a flat circular center portion and an inclined annular portion 7 which terminates in a horizontal flange 8 that rests upon the upper surface of the annular flange 5. The inclined portion 7 has a plurality of openings 9. A perforated strip 10 fits onto the upper surface of the inclined portion 7 and has openings that correspond to the openings 9 in the part 7. The strip 10 is held in place by lugs 11 which serve as guides and which permit the part 10 to slide. By rotating or sliding the member 7, the effective area of the openings 9 may be altered so as to adjust the humidity within the container. When the openings 9 are entirely closed, very little, if any, moisture escapes from the pan 1 which holds the moist sponge 12 and when the parts are so adjusted that holes 9 are entirely uncovered, the maximum amount of moisture will leave the pan. The cylindrical member 4 has a plurality of lugs 13 that co-operate with bayonet slots in the flange 3 and in flange 14 of the cover 15. These lugs and slots form a lock that holds the parts together. The bread, cake or other articles are placed upon the flat portion 6; the sponge 12 is filled with water and the openings 9 adjusted to the desired size. The top of the cover 15 is provided with a number of openings that may be opened and closed by rotating a knob 17 that controls the perforated closure plate 18. By opening and closing the holes 16, the box may be ventilated to any extent found to be necessary.

In Figs. 4, 5 and 6 I have shown a box that differs from that shown in Figs. 1 and 2 merely in this, that it is rectangular instead of round, the parts have therefore been designated by the same numerals as are employed in connection with Figs. 1 and 2, but are distinguished therefrom by having added thereto the letter "a". The upper edge of the transparent sides 4ª are strengthened at their tops by means of a U-shaped metal binder 19. The construction of the boxes illustrated in Figs. 1, 2, 4 and 5 may be as indicated in Fig. 3 if desired. In this modified construction the flange 2 is offset so as to form two flanges 2ᵇ and 2ᶜ, each in a different horizontal plane. When this construction is followed the flanges 5 and 5ª may be omitted and the cover 6 rest directly upon the upper surface of the flange 2ᶜ in the manner shown in Fig. 3.

In Figs 7, 8 and 9 I have illustrated a humidifier that differs slightly from those shown in Figures 1 to 6, but which still retains the broad feature of the latter. In this modification the casing 20 is preferably made of metal and is provided with a cover 21 hinged at 22. A drawer 23 fits into the box 20 in the manner shown in Fig. 8 and contains a sponge 12. Secured to the inside of the box 20 are angle supports 24 that serve to support a cover member 25 that has a plurality of openings 26, preferably one on each side. Slides 27 have transverse slots 28 and are held in place by pins 29 which pass through the slots. These slides may be moved back and forth so as to adjust the area of the openings 26 and thereby control the circulation of the moist air. In Fig. 9 I have shown a transverse section of a cigar case that has been equipped with the humidifier shown in Figs. 7 and 8. Where my humidifier is to be employed in connection with cigar cases without altering the latter, I preferably construct the device in the manner shown in Figs. 10, 11 and 12 in which there is a rectangular pan 30, that has attached to it a cover 31 which is preferably made in two parts and hinged along the center in the manner indicated at 32. The cover members have notches 33 whose effective areas may be varied by moving the slide 34. When more than one of these pans are needed, they are put end to end and clipped together by means of a metal clip 35 in the manner shown in Fig. 12. In Fig. 13 I have shown a transverse section of a cigar case provided with a humidifier like the one shown in Figs. 10 and 11.

Having now described my invention what I claim as new is:

1. A humidifier cabinet comprising, in combination, a pan like member having upwardly extending sides consisting of two portions integrally connected and offset with respect to each other, the upper portion being the farther from the center of the pan whereby a flange is formed that connects the upper edge of the lower portion to the lower edge of the upper portion, a removable section of side wall resting on and extending upwardly from said flange, a false bottom between the pan and the lower end of the upwardly extending section, said bottom having its outer edges inclined and provided with openings and slides for varying the effective area of said openings.

2. A humidifier cabinet comprising, in combination, a pan-like member having upwardly extending sides, said sides consisting of two parts offset with respect to each other, said parts being connected by a flange having parts of its upper surfaces offset and located in horizontally spaced planes, a false bottom supported on the lowermost of said offset surfaces, side walls supported on the upper of said horizontal surface and a cover secured to the top of said side walls.

3. A humidifier cabinet comprising in combination, a pan-like member having upwardly extending sides, said sides consisting of two parts offset with respect to each other, said parts being connected by a flange having parts of its upper surfaces offset and located in horizontally spaced planes, a false bottom supported on the lowermost of said offset surfaces, said bottom being provided with perforations, side walls supported on the upper of said horizontal surfaces and a cover secured to the upper edges of said side walls.

4. A humidifier cabinet, comprising, in combination, a container consisting of a bottom portion of sheet metal formed in the shape of a shallow pan, the sides of said pan being substantially perpendicular to the bottom and composed of two offset portions which are connected by a flange forming a shoulder, said flange having its upper surface offset, a false bottom supported on the innermost of said offset surfaces, side walls supported by the outermost of said surfaces and a cover detachably secured to the upper edge of said side walls.

In testimony whereof I affix my signature.

RIKIJIRO OSAKA.